United States Patent
Chen et al.

(10) Patent No.: US 7,512,266 B2
(45) Date of Patent: Mar. 31, 2009

(54) METHOD AND DEVICE FOR LUMINANCE CORRECTION

(75) Inventors: Yi-Fan Chen, Taichung (TW); Hsu-Lin Fanchiang, Hsinchu (TW)

(73) Assignee: Mstar Semiconductor, Inc., Hsinchu County (TW)

( * ) Notice: Subject to any disclaimer, the term of this patent is extended or adjusted under 35 U.S.C. 154(b) by 678 days.

(21) Appl. No.: 11/184,984

(22) Filed: Jul. 20, 2005

(65) Prior Publication Data

US 2006/0050181 A1    Mar. 9, 2006

(30) Foreign Application Priority Data

Sep. 6, 2004    (TW)  ............... 93126821 A

(51) Int. Cl.
*G06K 9/00*    (2006.01)
(52) U.S. Cl. ................................. 382/162
(58) Field of Classification Search ............. 382/162, 382/167, 274; 348/587, 592, 599, 603, 649–650, 348/679, 708, 712–713; 358/518–520
See application file for complete search history.

(56) References Cited

U.S. PATENT DOCUMENTS

| | | | | |
|---|---|---|---|---|
| 4,489,349 A | * | 12/1984 | Okada | 348/674 |
| 4,597,006 A | * | 6/1986 | Orsburn | 348/586 |
| 5,412,433 A | * | 5/1995 | Holland et al. | 348/650 |
| 6,480,241 B1 | * | 11/2002 | Boccaccio | 348/708 |
| 7,394,932 B2 | * | 7/2008 | Kida et al. | 382/169 |

FOREIGN PATENT DOCUMENTS

| | | |
|---|---|---|
| JP | 5205039 | 8/1993 |
| JP | 6339017 | 12/1994 |

* cited by examiner

*Primary Examiner*—Jose L Couso
(74) *Attorney, Agent, or Firm*—WPAT., P.C.; Justin King

(57) ABSTRACT

The present invention discloses a method and a device for luminance correction so as to adjust the luminance of a digital image. The present invention is characterized in that luminance correction is performed according to R, G and B values of a pixel in the digital image such that the contrast between each color of the digital image is enhanced while luminance is being adjusted.

9 Claims, 3 Drawing Sheets

METHOD AND DEVICE FOR LUMINANCE CORRECTION

BACKGROUND OF THE INVENTION

1. Field of the Invention

The present invention generally relates to a method and a device for luminance correction and, more particularly, to a method and a device for luminance correction to efficiently adjust luminance and enhance the contrast between each color of digital images.

2. Description of the Prior Art

With the arrival of the digital era, the digital video replaces the traditional analog video gradually. Owing to the popularity of digital video, digital image processing is being paid attention to.

Taking photography of digital cameras forming digital images for example, the sensing device of digital camera for detecting incoming light while taking picture is made of CCDs (charge-coupled device) in array arrangement. Each CCD has a color filter (red, green or blue). Therefore, each CCD can sense the intensity of a monochromatic light (R, G, or B) through its filter while light projects on the CCDs.

Accordingly, the process of taking pictures by the digital camera to produce digital images, at first, enables the light into camera lenses, senses the light and generates corresponding induced current, representing the R, G, or B value of a pixel, through the CCDs of the digital camera. The image processing unit of the digital camera generates the digital image utilizing the R, G, and B values of pixels. The colors of each pixel are seen as variable combinations of the so-called primary colors red (R), green (G), and blue (B).

In order to adjust the images shown on a display monitor, like a TV, a conventional method for luminance correction is to find out the corresponding luminance signal (Y) and chrominance signal (C) according to the R, G, and B values of pixels in an image. Luminance correction according to the prior art adjusts the luminance signal directly. In other words, the prior art directly adjusts the corresponding luminance signal of the digital image for luminance correction.

In the prior art method, although the luminance of a digital image can be adjusted, the luminance of each pixel is adjusted with the same gain value at the same time. Therefore, the degree of luminance correction for each pixel is identical. In other words, the contrast between each color in the digital image becomes lowered using the conventional method for luminance correction.

Therefore, there is need in providing a method and a device for luminance correction to prevent the contrast between each color from becoming lowered while adjusting the luminance of digital image. Furthermore, the present invention provides high luminance and improves the contrast between each color in the digital image while adjusting the luminance of digital images.

SUMMARY OF THE INVENTION

It is a primary object of the present invention to prevent the contrast between each color from becoming lowered, and further to provide higher luminance and improve the contrast between each color while adjusting the luminance of a digital image.

In order to achieve the foregoing object, the present invention provides a method for luminance correction adjusting the luminance of a pixel according to the R (red), G (green), and B (blue) values of three primary colors of the pixel.

In one preferred embodiment of the present invention, a final luminance gain value is obtained by multiple correction calculations according to the R, G and B values of the pixel and the R, G and B values of the pixel are adjusted accordingly.

The correction calculation includes luminance correction calculation, saturation calculation, and comparative calculation. One can obtain a first gain value, a second gain value, and a third gain value according to the luminance correction calculation, saturation correction calculation, and comparative calculation; and obtain the final luminance gain value according to the first gain value, second gain value, and third gain value. The luminance correction calculation is expressed as:

$$Y(Rin, Gin, Bin) = C1 \times Rin + C2 \times Gin + C3 \times Bin$$

where Rin, Gin, and Bin denote the R, G and B values of the pixel, respectively, and C1, C2, and C3 are user-defined constants. The calculation result is the first gain value.

The saturation correction calculation is expressed as:

$$S(Rin, Gin, Bin) = C4 \times Rin + C5 \times Gin + C6 \times Bin$$

where Rin, Gin, and Bin denote the R, G and B values of the pixel, respectively, and C4, C5, and C6 are user-defined constants. The calculation result is the second gain value.

The comparison correction calculation is expressed as Cmax(Rin, Gin, Bin), that is, the maximum value of R, C, and B of the pixel is the third gain value.

The first gain value multiplies the second gain value and the third gain value to get the final gain value. According to the present invention, the R, G, and B values of each pixel could be adjusted using the final gain value.

The present invention further provides a luminance correction circuit, comprising: a plurality of correction calculation devices, receiving three primary colors of a pixel so as to output a plurality of gain values; and a synthesizing device, receiving R, G and B values of the three primary colors of the pixel and the gain values, and outputting the R, G and B values of the pixel according to the gain values.

In the preferred embodiment of the present invention, the correction calculation devices comprises: a luminance correction calculation circuit, receiving the R, G and B values of the pixel for calculating so as to output a first gain value; a saturation correction calculation circuit, receiving the R, G and B values of the pixel for calculating so as to output a second gain value; and a comparative calculation circuit, receiving the R, G and B values of the pixel for calculating so as to output a third gain value.

Furthermore, the synthesizing device comprises a first multiplier, receiving the first, the second and the third gain values so as to output a final gain value; a second multiplier, receiving the R value of the pixel and the final gain value so as to output a first output value; a third multiplier, receiving the G value of the pixel and the final gain value so as to output a second output value; and a fourth multiplier, receiving the B value of the pixel and the final gain value so as to output a third output value, wherein the first, the second and the third output values construct a corrected pixel by the luminance correction circuit values construct a pixel after the correction of luminance correction circuit.

DETAILED DESCRIPTION OF THE PREFERRED EMBODIMENT

Figure 1:
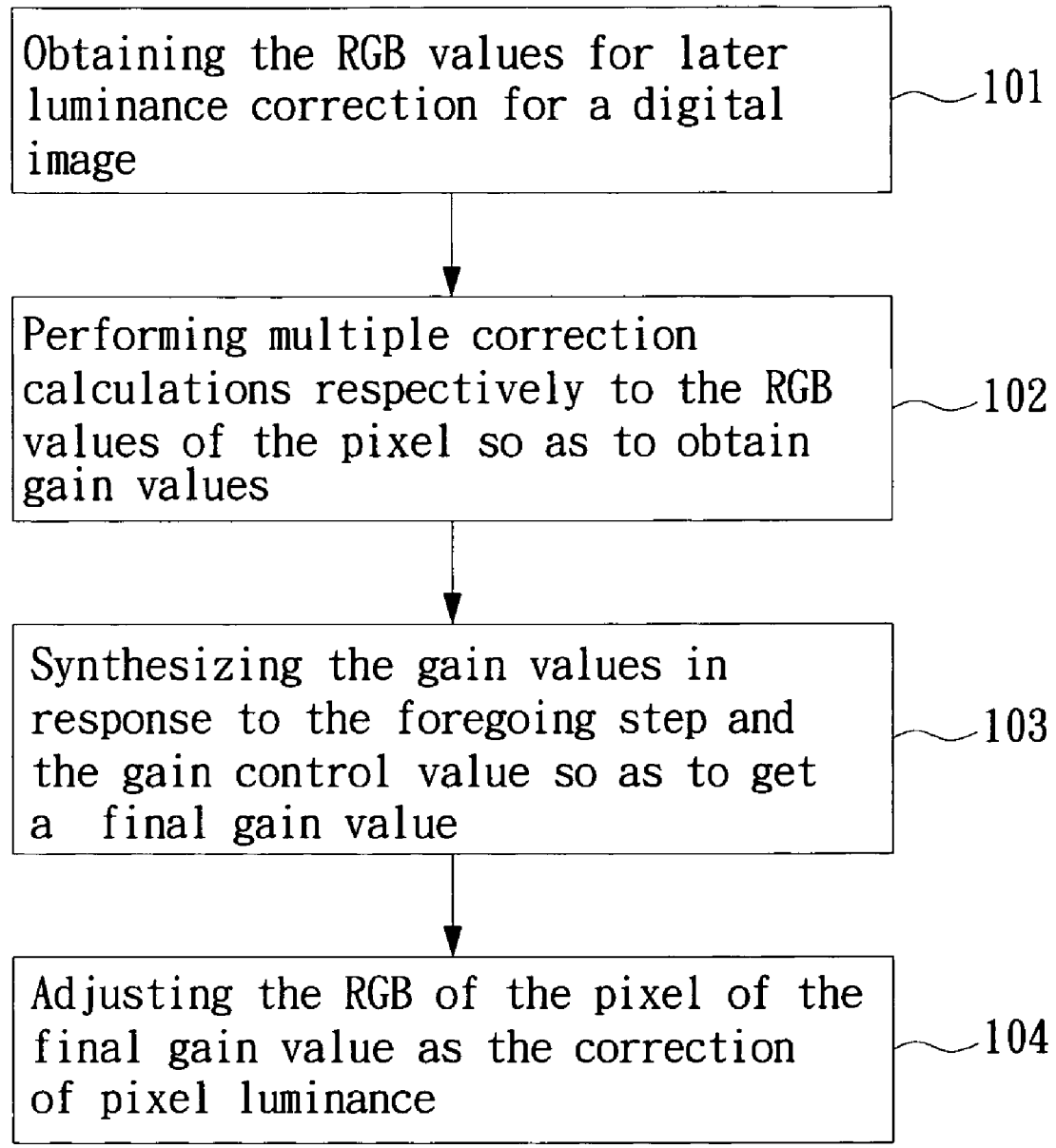
FIG. 1 is a flow chart showing a method for luminance correction in accordance with one preferred embodiment of the present invention.

The objects, spirits and advantages of the preferred embodiment of the present invention will be readily understood by the accompanying drawings and detailed descriptions, as described hereinafter:

Please refer to FIG. 1, which is a flow chart showing a method for luminance correction in accordance with one preferred embodiment of the present invention. In Step 101, R, G and B values of three primary colors are obtained for later luminance correction of a digital image.

While the information of R, G and B values of each pixel in the digital image is obtained, multiple calculation procedures for the R, G and B values of each pixel can be performed. For example, luminance correction calculation, saturation calculation, or comparative calculation according to the R, G, and B values of each pixel is performed so as to obtain gain values respectively. The gain values determine the degree of final luminance correction of each pixel, as described in Step 102. For example, the luminance correction calculation is expressed as $$Y(Rin, Gin, Bin) = C1 \times Rin + C2 \times Gin + C3 \times Bin$$

wherein Rin, Gin, and Bin denote said R, G and B values of each pixel, respectively, and C1, C2, and C3 are user-defined constants.

Likewise, saturation correction calculation can determine gain functions by using the R, G, and B values as variables. The saturation calculation is expressed as $$S(Rin, Gin, Bin) = C4 \times Rin + C5 \times Gin + C6 \times Bin$$

wherein Rin, Gin, and Bin denote said R, G and B values of each pixel, respectively, and C4, C5, and C6 are user-defined constants.

As for comparative calculation, it is to find out the maximum value of the R, G and B values of each pixel. The gain function is denoted by Cmax (Rin, Gin, Bin) as described in Step 102.

The intention of the above calculations is to consider whether the pixel color is shifted to any color of R, G, or B, so as to weight the shifted color during luminance correction and make the contrast between each pixel more obvious.

Then, the gain value in Step 102 is synthesized with an additional gain control value so as to determine a final gain value. The luminance of each pixel is finally adjusted according to the final gain value, as described in Step 103.

Figure 2:
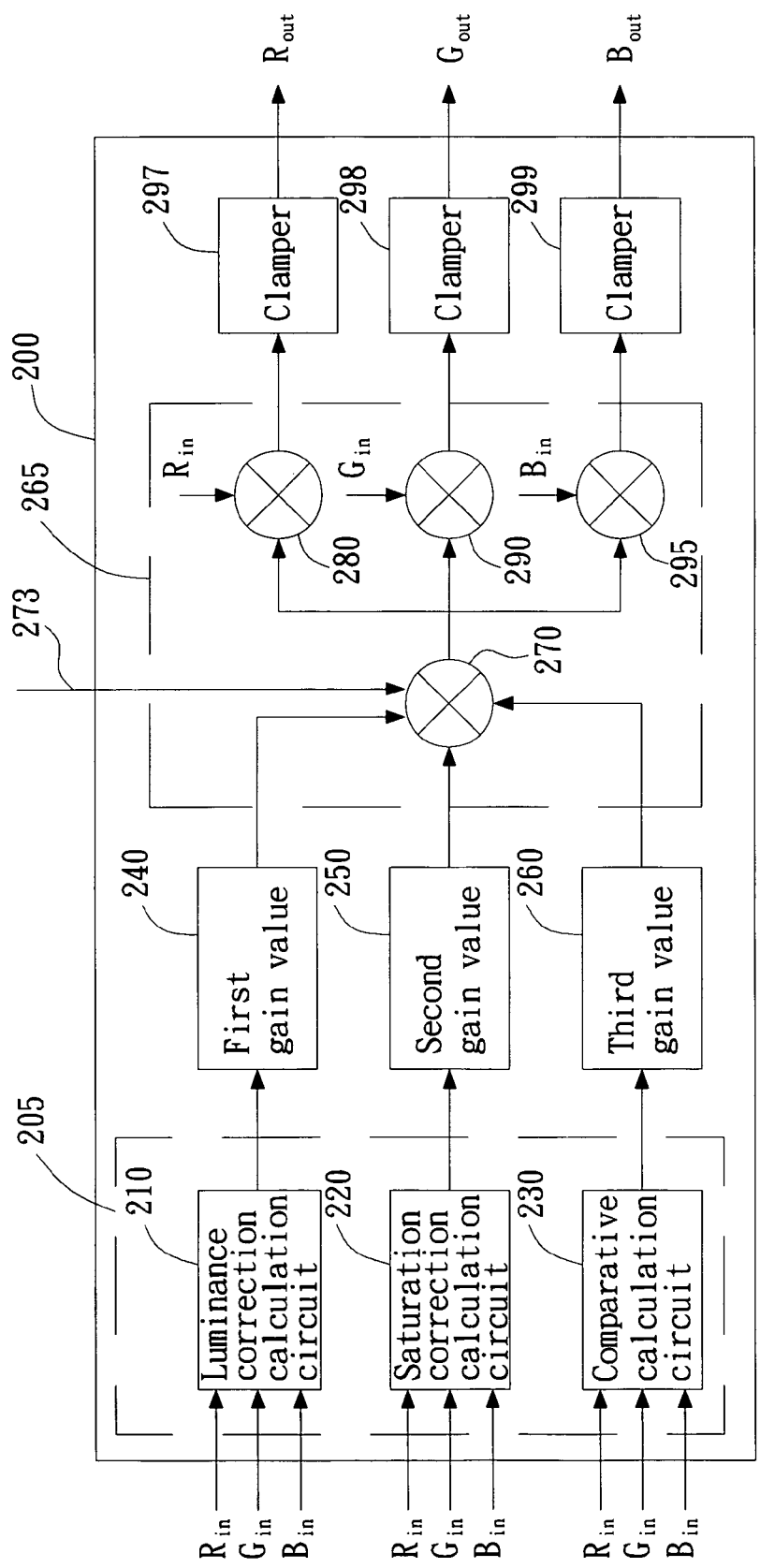
FIG. 2 is a circuit diagram showing a device for high brightness color (HBC) correction in accordance with the preferred embodiment of the present invention.

FIG. 2 shows a circuit of high brightness color (HBC) correction in accordance with the preferred embodiment of the present invention. The high brightness color (HBC) correction device 200 comprises a correction calculation device 205 and a synthesizing device 265. The correction calculation device 205 comprises a luminance correction calculation circuit 210, a saturation correction calculation circuit 220 and a comparative calculation circuit 230. The three circuits 210, 220 and 230 receive the R, G and B values of a pixel, i.e., Rin, Gin, and Bin.

The luminance correction calculation circuit 210, the saturation correction calculation circuit 220 and the comparative calculation circuit 230 perform calculation on Rin, Gin, and Bin after receiving Rin, Gin, and Bin, so as to obtain a first gain value 240, a second gain value 250, and a third gain value 260. The procedure for each circuit calculating Rin, Gin, and Bin as to obtain the first gain value 240, the second gain value 250, and the third gain value 260 can be exemplified in Step 102 in FIG. 1. Said correction calculation circuits could be practiced using digital logic technology which is well known by a person in the art.

The first gain value 240, the second gain value 250 and the third gain value 260 are synthesized by the synthesizing device 265, so as to obtain the weighted R, G, and B values for output. A final gain value 275 for adjusting Rin, Gin and Bin of the pixel is the end product of a multiplier 270. A multiplier 270 of the synthesizing device 265 receives the first gain value 240, the second gain value 250, the third gain value 260 and the external gain control signal 273, and output the final gain value 275. Each value of Rin, Gin, and Bin of the pixel is multiplied with the final gain value 275 by multipliers 280, 290, and 295 for correction of the pixel luminance. Wherein the external gain control signal 273 could be used to increase or decrease the final gain value or just set to 1 for unchanging the final gain value 275. For a well user defined group of constant parameters of C1, C2, C3, C4, C5, and C6, the external gain control signal could be removed.

In the preferred embodiment of the present invention, in order to prevent the value outputted from the multiplication of Rin, Gin, and Bin, and the final gain value 275 from exceeding the allowed limit, the output terminals of the multipliers 280, 290, and 295 are equipped with the dampers 297, 298, and 299, respectively, so as to restrict the output values of the multipliers 280, 290, and 295 to the usable value range. For example, the output value of the multiplier 280 is 261, and the maximum value of R is 255, the damper 297 will confine the output of multiplier 280 to the value of 255.

Figure 3:
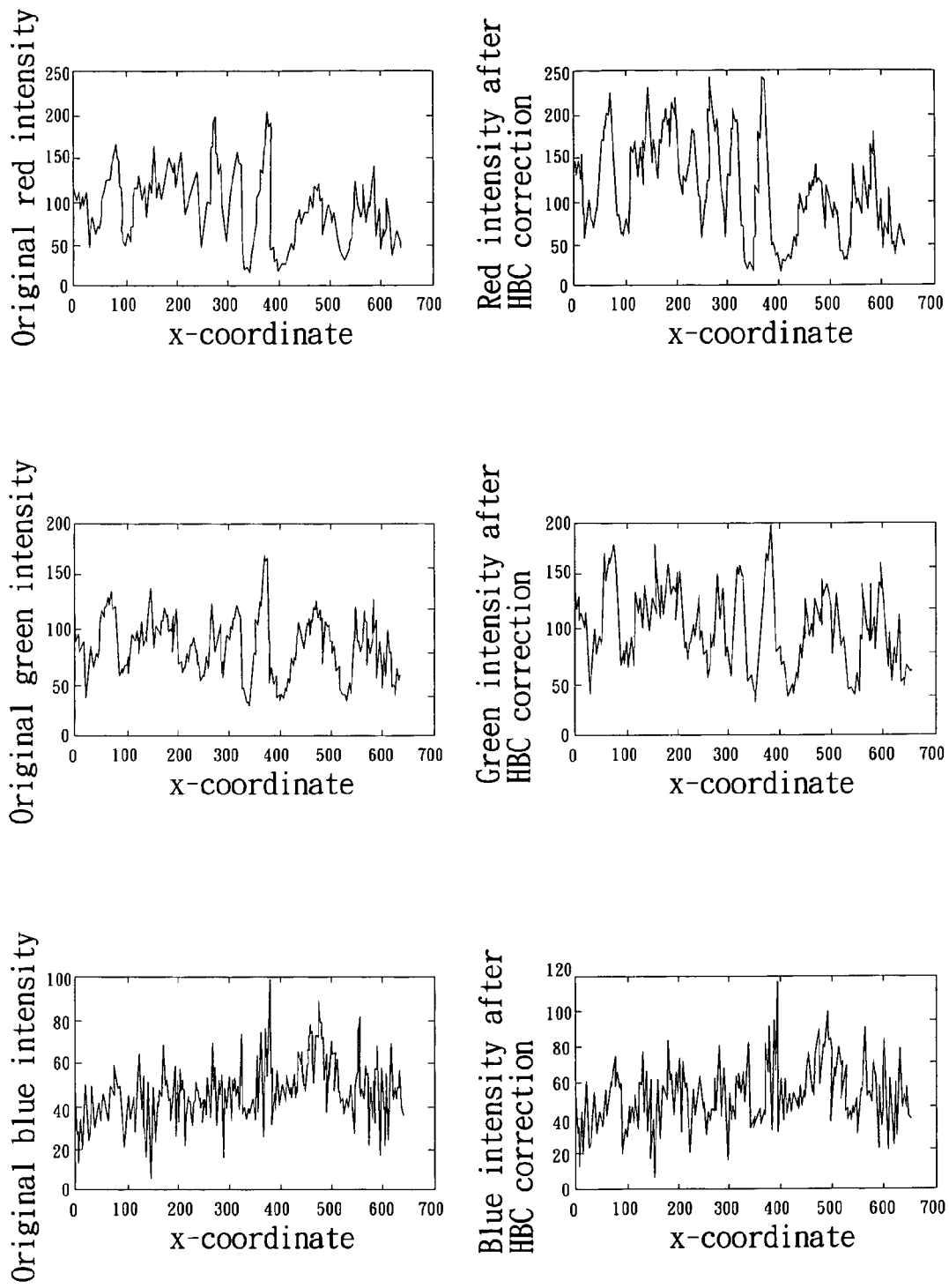
FIG. 3 is a comparative graph showing each color of a digital image in the x-coordinate by HBC correction device in accordance with the preferred embodiment of the present invention.

Please refer to FIG. 3, which is a comparative graph showing each color of a digital image in the x-coordinate by HBC correction device in accordance with preferred embodiment of the present invention. In FIG. 3, the intensity of original red (R), green (G), and blue (B) of a digital image in the x-coordinate, is limited at 200, 175, and 100. After the HBC luminance correction, it should be noted that the intensity of red, green, and blue in the x-coordinate is increased, respectively, to 250, 200, and 120 at most.

Therefore, after luminance correction of the present invention, the intensity of each color is enhanced. The contrast between each color is also enhanced.

Accordingly, the present invention discloses a method and a device for luminance correction by taking the three primary colors into account so as to adjust the luminance of a digital image. Meanwhile, the contrast between each color is also enhanced.

Although this invention has been disclosed and illustrated with reference to particular embodiment, the principles involved are susceptible for use in numerous other embodiments that will be apparent to persons skilled in the art. This invention is, therefore, to be limited only as indicated by the scope of the appended claims.

What is claimed is:

1. A method for luminance correction in a display device, comprising:
    obtaining a final luminance gain value by a luminance correction calculation, a saturation correction calculation and a comparative calculation according to R,G and B values of a pixel; and
    adjusting said R, G and B values of said pixel according to said final luminance gain value.

2. The method for luminance correction as recited in claim 1, further comprising:

obtaining a first gain value, a second gain value, and a third gain value according to said luminance correction calculation, said saturation correction calculation and said comparative calculation respectively;and obtaining said final luminance gain value according to said first gain value, said second gain value and said third gain value.

3. The method for luminance correction as recited in claim 2, further comprising:

obtaining said final luminance gain value according said first gain value, said second gain value, said third gain value and a gain control value.

4. The method for luminance correction as recited in claim 1, wherein said luminance correction calculation is expressed as $$Y(Rin, Gin, Bin)=C1\times Rin+C2\times Gin+C3\times Bin$$

where Rin, Gin, and Bin denote said R, G and B values of said pixel, respectively, and *C*1, *C*2, and *C*3 are user-defined.

5. The method for luminance correction as recited in claim 1, wherein said saturation correction calculation is expressed as $$S(Rin, Gin, Bin)=C4\times Rin+C5\times Gin+C6\times Bin$$

where Rin, Gin, and Bin denote said R, G and B values of said pixel, respectively, and *C*4 ,*C*5 ,and *C*6 are user-defined.

6. The method for luminance correction as recited in claim 1, wherein said comparative calculation calculates a maximum value of said R, G and B values of said pixel.

7. A luminance correction circuit on a display device, comprising:

a luninance correction calculation circuit, receiving said R,G and B values of said pixel for calculating so as to output a first gain value;

a saturation correction calculation circuit, receiving said R,G and B values of said pixel for calulating so as to output a second gain value;

a comparative calculation circuit, receiving said R,G and B values of said pixel for calculating so as to output a third gain value; and a synthesizing device, coupled to said calculation circuits, for receiving R, G and B values of said three primary colors of said pixel and said gain values, and adjusting said R, G and B values of said pixel according to said first, second and third gain values to output the adjusted R, G and B values.

8. The luminance correction circuit as recited in claim 7, wherein said synthesizing device further comprises:

a first multiplier, receiving said first, said second and said third gain values so as to output a final gain value;

a second multiplier, receiving said R value of said pixel and said final gain value so as to output a first output value;

a third multiplier, receiving said G value of said pixel and said final gain value so as to output a second output value; and a fourth multiplier, receiving said B value of said pixel and said final gain value so as to output a third output value, wherein said first, said second and said third output values construct a corrected pixel by said luminance correction circuit.

9. The luminance correction circuit as recited in claim 8, further comprises:

a first clamper, receiving said first output value so as to output a first clamped value;

a second clamper, receiving said second output value so as to output a second clamped value; and a third clamper, receiving said third output value so as to output a third clamped value.

\* \* \* \* \*